(12) United States Patent
Xiong et al.

(10) Patent No.: US 11,810,350 B2
(45) Date of Patent: Nov. 7, 2023

(54) PROCESSING OF SURVEILLANCE VIDEO STREAMS USING IMAGE CLASSIFICATION AND OBJECT DETECTION

(71) Applicant: Western Digital Technologies, Inc., San Jose, CA (US)

(72) Inventors: Shaomin Xiong, Fremont, CA (US); Toshiki Hirano, San Jose, CA (US); Damien Kah, San Jose, CA (US); Rajeev Nagabhirava, San Jose, CA (US); David Berman, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 250 days.

(21) Appl. No.: 17/326,628

(22) Filed: May 21, 2021

(65) Prior Publication Data

US 2022/0374635 A1 Nov. 24, 2022

(51) Int. Cl.
*G06T 7/70* (2017.01)
*G06V 20/40* (2022.01)
*G08B 13/196* (2006.01)
*G06V 20/52* (2022.01)

(52) U.S. Cl.
CPC ............... *G06V 20/41* (2022.01); *G06T 7/70* (2017.01); *G06V 20/52* (2022.01); *G08B 13/19608* (2013.01); *G08B 13/19619* (2013.01); *G08B 13/19663* (2013.01)

(58) Field of Classification Search
CPC .......... G06V 20/41; G06V 20/52; G06T 7/70; G08B 13/19608; G08B 13/19619; G08B 13/19663
See application file for complete search history.

(56) References Cited

U.S. PATENT DOCUMENTS

| | | | |
|---|---|---|---|
| 8,675,065 B2 | 3/2014 | Itoh et al. | |
| 10,127,445 B2 | 11/2018 | Saptharishi et al. | |
| 10,402,697 B2 | 9/2019 | Yang et al. | |
| 2005/0169367 A1* | 8/2005 | Venetianer | G08B 13/19652 375/E7.006 |
| 2012/0062732 A1* | 3/2012 | Marman | G08B 13/19682 348/142 |
| 2019/0130165 A1* | 5/2019 | Seshadri | G06F 18/24133 |
| 2021/0089833 A1* | 3/2021 | Anantha | G06V 10/82 |

* cited by examiner

*Primary Examiner* — Syed Haider
(74) *Attorney, Agent, or Firm* — PATENT LAW WORKS LLP

(57) ABSTRACT

Systems and methods for processing surveillance video streams using image classification and object detection are described. Video data from a video image sensor may be processed using an image classifier to determine whether an object type is present in a video frame. If the object type is present, the video frame and/or subsequent video frames may be processed using an object detector to provide additional object data, such as position information, for use in other video surveillance processes. In some examples, an event message may be generated and sent to a video surveillance application in response to selective object detection.

20 Claims, 6 Drawing Sheets

PROCESSING OF SURVEILLANCE VIDEO STREAMS USING IMAGE CLASSIFICATION AND OBJECT DETECTION

TECHNICAL FIELD

The present disclosure generally relates to video surveillance systems and, more particularly, to video surveillance systems for object detection.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. Client or user systems are communicatively connected to the server system to request, receive, and display streams of recorded video data and/or related alerts and analytics.

An increasing number of video surveillance systems are using smart video cameras or otherwise moving compute resources to edge devices in the system, rather than relying solely on a network video recorder appliance or cloud-based processing. For example, some video cameras may be configured with processors, memory, and storage resources far exceeding those needed to convert signals from video image and/or audio sensors into a desired video format for transmission to the network video recorder. However, even these increased compute resources may be limited by space, cost, and other considerations and are unlikely to match the compute resources available in a network video recorder, let alone cloud-based video processing servers.

It may be advantageous to perform real-time object detection processing of each video stream in a network-based surveillance system. However, continuous processing of video data through object detectors for each video data stream may be impractical from a computing resource perspective. In addition, some object detection algorithms may not be capable of desired reliability, particularly with constrained compute resources.

Systems and methods for selectively using object detectors and improving their reliability may be advantageous. A reliable and efficient way of selectively using object detectors, particularly in edge video surveillance devices, may be needed.

SUMMARY

Various aspects for processing of surveillance video streams using a combination of image classification and object detection are described.

One general aspect includes a system including a video image sensor and a controller configured to: receive video data from the video image sensor, where the video data includes a time-dependent video stream of video frames captured by the video image sensor; determine, using an image classifier, whether a first object type is present in a first frame of the video data; determine, using an object detector, position information for a detected object in the video data having the first object type; and send, over a network, an event notification to a video surveillance application.

Implementations may include one or more of the following features. The controller may include: a processor; a memory; the image classifier, stored in the memory for execution by the processor, and configured to use a first set of processor resources and a first set of memory resources; and the object detector, stored in the memory for execution by the processor, and configured to use a second set of processor resources and a second set of memory resources. The first set of processor resources may be less than the second set of processor resources and the first set of memory resources may be less than the second set of memory resources. The system may further include a video camera housing that encloses: the video image sensor; the controller; and a network interface configured to communicate with the network. The image classifier may be configured to: process each video frame in the time-dependent video stream; and return a binary indicator of the first object type. The object detector may be configured to: selectively process, responsive to the image classifier determining that the first object type is present, a subset of video frames to determine the position information for the detected object; and return position information values for the detected object. The image classifier may be further configured to return an image type confidence value and the object detector may be further configured to return an object detected confidence value. The controller may be further configured to: compare the object detected confidence value to an object verification threshold; responsive to the object detected confidence value meeting the object verification threshold, verify, using the image classifier, the first object type; and responsive to the verification of the first object type being negative, report a detection failure event. The controller may be further configured to: initiate, responsive to the position information for the detected object, an object tracking algorithm for the detected object to process subsequent video frames of the time-dependent video stream; determine, using the object tracking algorithm, whether the detected object is present in the subsequent video frames of the time-dependent video stream; responsive to the object tracking algorithm determining an object exit event, verify, using the image classifier, the first object type in a video frame corresponding to the object exit event; and responsive to verifying that the first object type is present in the video frame corresponding to the object exit event, report a detection failure event. The image classifier may be configured to process the video data from the video image sensor as video frames are received by the controller and the object detector may be configured to selectively process the video data responsive to the image classifier determining that the first object type is present in a classified video data frame. The controller may include: a plurality of image classifiers, where each image classifier of the plurality of image classifiers is configured for a different object type; and a plurality of object detectors, where each object detector of the plurality of object detectors is configured for a different object type. The controller may be further configured to: process the video data through the plurality of image classifiers to determine at least one object type for the first frame; determine a corresponding object detector from the plurality of object detectors, the corresponding object detector configured to detect an object type corresponding to the at least one object type determined by the plurality of image classifiers; and process the first video frame using the corresponding object detector to determine the position information for the detected object. The controller may be further configured to send the position information and image data for the detected object for further processing by an analytics engine using a model selected from: an object recognition model; an object tracking model; and an attribute detection model.

Another general aspect includes a computer-implemented method that includes receiving video data from a video image sensor, where the video data includes a time-dependent video stream of video frames captured by the video image sensor; determining, using an image classifier, whether a first object type is present in a first frame of the video data; determining, using an object detector, position information for a detected object in the video data having the first object type; and sending, over a network, an event notification to a video surveillance application.

Implementations may include one or more of the following features. The computer-implemented method may include: configuring a controller to use a first set of compute resources for the image classifier and use a second set of compute resources for the object detector, where the first set of compute resources is less than the second set of compute resources. The controller may include compute resources including a processor and a memory, the image classifier and the object detector may be stored in the memory for execution by the processor and the controller may execute: receiving the video data from the video image sensor; determining whether the first object type is present; determining position information for the detected object; and sending the event notification. The controller, the video image sensor, and a network interface for communicating over the network may be disposed within a video camera housing. The computer-implemented method may include: processing, with the image classifier, each video frame in the video stream; returning, by the image classifier, a binary indicator of the first object type; selectively processing, with the object detector and responsive to the image classifier determining that the first object type is present, a subset of video frames to determine the position information for the detected object; and returning, by the object detector, position information values for the detected object. The computer-implemented method may include: returning, by the image classifier, an image type confidence value; and returning, by the object detector, an object detected confidence value. The computer-implemented method may include: comparing the object detected confidence value to an object verification threshold; responsive to the object detected confidence value meeting the object verification threshold, verifying, using the image classifier, the first object type; and responsive to the verification of the first object type being negative, reporting a detection failure event. The computer-implemented method may include: initiating, responsive to the position information for the detected object, an object tracking algorithm for the detected object to process subsequent video frames of the video stream; determining, using the object tracking algorithm, whether the detected object is present in the subsequent video frames of the time-dependent video stream; responsive to the object tracking algorithm determining an object exit event, verifying, using the image classifier, the first object type in a video frame corresponding to the object exit event; and responsive to verifying that the first object type is present in the video frame corresponding to the object exit event, reporting a detection failure event. The computer-implemented method may include: processing, by the image classifier, the video data from the video image sensor as video frames are received by a controller; and selectively processing, by the object detector, a subset of the video data responsive to the image classifier determining that the first object type is present in a classified video data frame. The computer-implemented method may include: processing the video data through a plurality of image classifiers to determine at least one object type for the first frame, where each image classifier of the plurality of image classifiers is configured for a different object type; determining a corresponding object detector from a plurality of object detectors, where each object detector of the plurality of object detectors is configured for a different object type and the corresponding object detector is configured to detect an object type corresponding to the at least one object type determined by the plurality of image classifiers; and processing the first video frame using the corresponding object detector to determine the position information for the detected object.

Still another general aspect includes a storage system that includes a video image sensor; at least one image classifier; at least one object detector; means for receiving video data from the video image sensor, where the video data includes a time-dependent stream of video frames captured by the video image sensor; means for determining, using the at least one image classifier, whether a first object type is present in a first frame of the video data; means for determining, using the at least one object detector, position information for a detected object in the video data having the first object type; and means for sending, over a network, an event notification to a video surveillance application.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve processing of video data by selectively using image classification and object detection to more efficiently utilize compute resources and/or increase object detector reliability. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
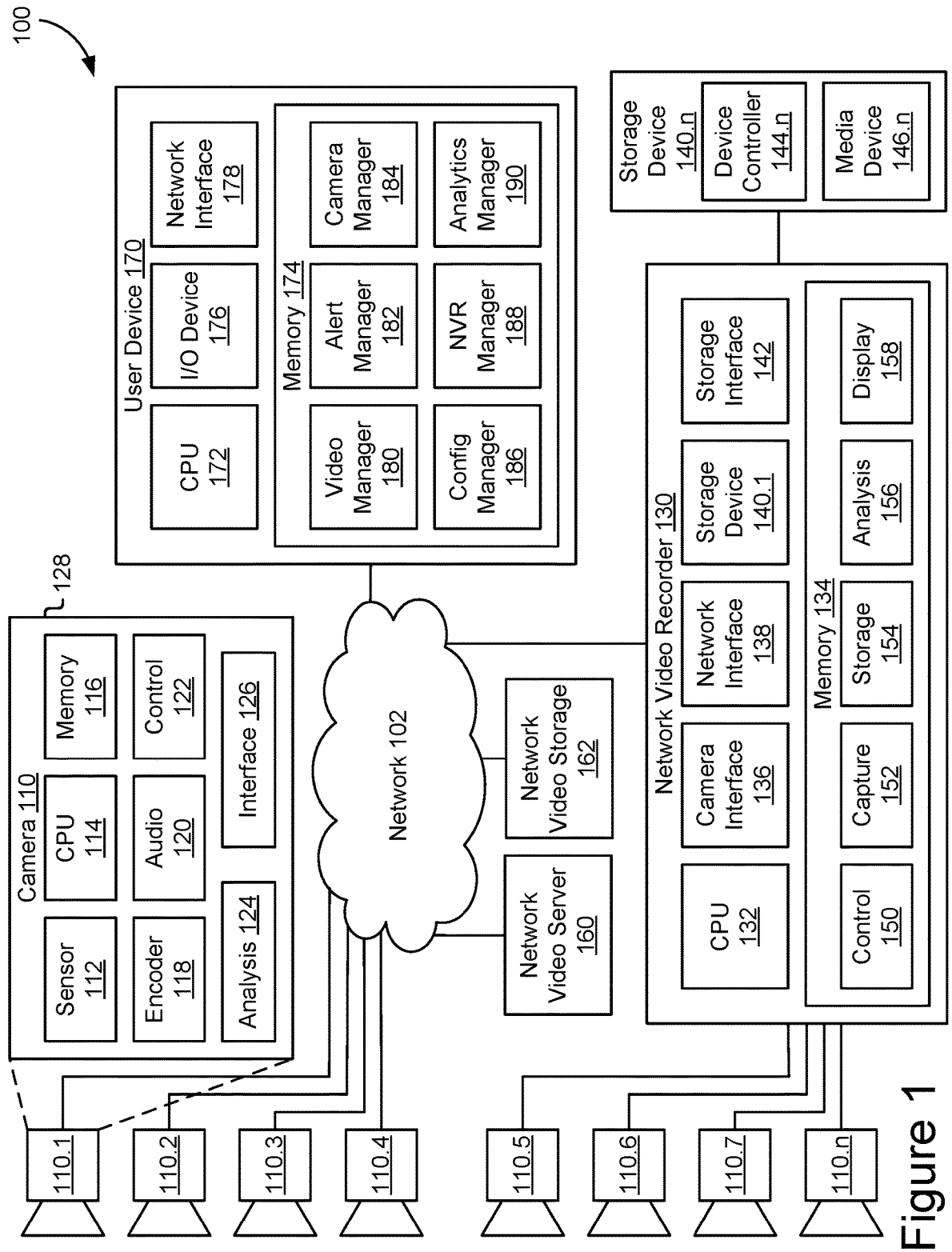
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.n in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.n, network video server 160, network video storage 162, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream of time-dependent video frames with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded and/or synchronized audio streams with their respective video streams. In some embodiments, video cameras 110 may include an image sensor 112, a processor (central processing unit (CPU), a neural processing unit, a vision processing unit, etc.) 114, a memory 116, an encoder 118, an audio channel 120, a control circuit 122, and/or a network interface 126. In some embodiments, video cameras 110 may include onboard analytics, such as a video analysis subsystem 124.

In some embodiments, the components of camera 110 may be configured in one or more processing systems or subsystems and/or printed circuit boards, chips, busses, etc. that are disposed or enclosed in a video camera housing 128. For example, image sensor 112, processor 114, memory 116, encoder 118, audio channel 120, control circuit 122, analysis subsystem 126, and/or a network interface 126 may comprise one or more application-specific integrated circuits (ASICs) mounted within a sealed plastic, metal, or similar housing with an aperture (often integrating a lens) for receiving light and one or more physical interconnects, such as a network port, for receiving power and communicatively coupling with other system components.

In some embodiments, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. For example, video camera 110 may include two image sensors, associated lenses, and data paths to the encoding and processing components in video camera 110. In some embodiments, multiple image sensors are supported by the same circuit board and/or processing subsystem containing processor 114, memory 116, encoder 118, audio channel 120, control circuit 122, analysis subsystem 124, and/or network interface 126.

Digital video data from image sensor 112 may be received by processor 114 for (temporary) storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video data generated by image sensor 112 into a time-dependent video stream composed of video frames at a determined frame rate (number of frames per second). In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats.

Camera 110 may include audio channel 120 configured to capture audio data to be processed and encoded with image data in the resulting video stream. In some embodiments, one or more microphones may be selectively enabled to capture audio data in parallel with the image data captured by image sensor 112. For example, microphone may be configured with an audio sensor that captures sound waves and converts them into a time-based audio data stream. In some embodiments, encoder 118 may include an audio encoder that operates in conjunction with the video encoder to encode a synchronized audio data stream in the video stream. For example, the video format used to by encoder 118 may include one or more audio tracks for encoding audio data to accompany the image data during video stream playback.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130, another video camera 110, and/or user device 170 to configure video formats, enable and disable filters, set motion detection, auto tracking, and similar features, and/or initiate video data streaming. In some embodiments, one or more systems may provide PTZ position control signals (and/or PTZ positioning commands converted to PTZ position control signals by control circuit 122) through the API.

In some embodiments, video camera 110 may include video analysis subsystem 124 configured for onboard video analytics. For example, video analysis subsystem 124 may be configured to use processor 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries. In some embodiments, video analysis subsystem 124 may be configured to support real-time image classification and object detection within camera 110 without processing support from network video recorder 130 or network video server 160. For example, video analysis subsystem 124 may receive a video stream (from sensor 112 and/or encoder 118), classify the video frame to determine whether an object type of interest is present and, if so, initiate an object detector to determine the object's position within the video frame (and/or subsequent video frames).

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (PoE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.*n*. In some embodiments, camera interface 136 may include a PoE network switch for providing power to connected cameras and routing data packets to and from cameras 110.5-110.*n*, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD), solid state drive (SSD), flash memory-based removable storage (e.g., secure data (SD) card), embedded memory chips, etc. In some embodiments, storage device 140 is, or includes, a plurality of solid-state drives. In some embodiments, network video recorder 130 may include internal storage device 140.1 and expandable storage that enables additional storage devices 140.n to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.n may be of the same storage device type or a different storage device type.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.n. In some embodiments, storage interface 142 may include a wireless data connection with sufficient bandwidth for video data transfer. Depending on the configuration and protocols used by storage interface 142, storage device 140.n may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to network video recorder 130. Video capture subsystem 152 may be configured to pass each received video stream to video storage subsystem 154, video analysis subsystem 156, and/or video display subsystem 158. For example, received video streams may be buffered by video capture subsystem 152 before being streamed to video storage subsystem 154 and split into dual video streams with different video parameters for video analysis subsystem 156 and video display subsystem 158.

In some embodiments, video storage subsystem 154 may include interface protocols and a set of functions and parameters for managing storage of video data in storage devices 140 and/or network video storage 162 for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video analysis subsystem 156 may include event handling logic for determining response to detection of one or more detected events, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to network video recorder 130 and/or via network 102 within a LAN, WAN, VPN, or the internet.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, user device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Network video recorder (NVR) manager 188 may include interface protocols and a set of functions and parameters for identifying, configuring, and managing network video recorder 130. For example, each of camera manager 184, configuration manager 186, and/or NVR manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or NVR manager 188 may provide changes parameters to the effected components, such as camera manager 184 sending camera configuration parameter changes to selected cameras 110, NVR manager 188 sending NVR configuration parameter changes to network video recorder 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data received by network video recorder 130 and/or selecting, training, and managing those algorithms.

Figure 2:
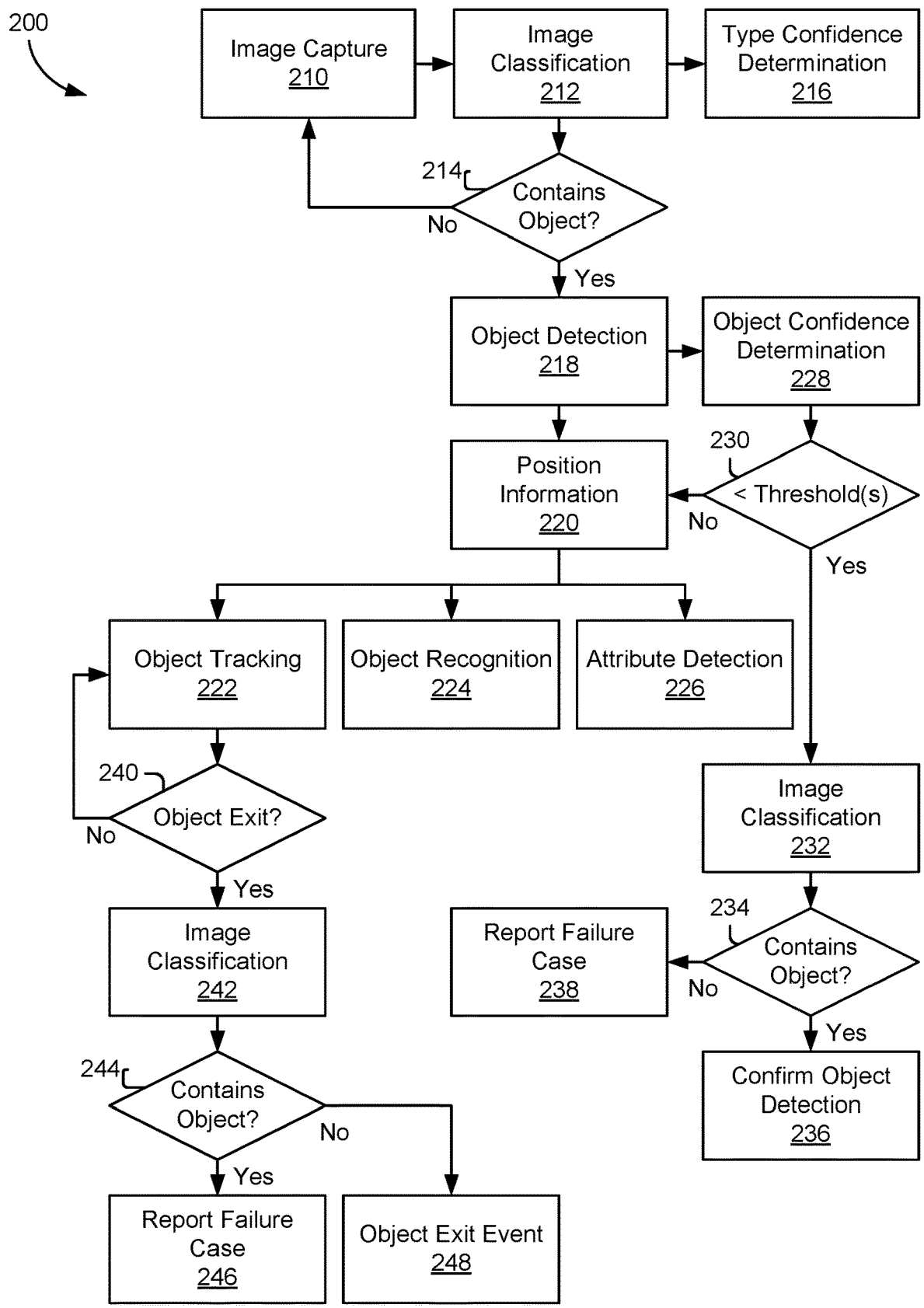
FIG. 2 schematically illustrates a combination of image classification and object detection that may be used by the computer-based surveillance system of FIG. 1.

FIG. 2 shows a schematic representation of using image classification to support object detection that may be implemented in a computer-based surveillance system 200, such as surveillance system 100 in FIG. 1. At block 210, an image is captured by a video camera. For example, a video image sensor may generate image data that is processed into video frames at a given frame rate.

At block 212, image classification may be executed for the video frames. For example, each video frame may be processed through an image classification algorithm configured to determine whether a particular object type is present in the video frame. Image classification may include computational image processing that attempts to comprehend an entire image as a whole and assign a specific label, such as an object type. Each image classifier may be configured to identify the presence or absence of one object type and return a binary indicator of whether the object is present or not. Multiple occurrences of the object type may not generate any different result than a single object. Example image classification algorithms or models may include EfficientNet, MobileNet, Visual Graphics Group (VGG-16), Inception, ResNet50, etc. In contrast, object detection involves both classification and localization and may be used to detect multiple objects in the same video frame. Object detectors may require more computing resources, compared to image classifiers, to process the same video frame.

At block 214, whether or not the video frame contains any objects of the object type, such as people, cars, license plates, etc., may be determined by image classification 212. If the video frame does not contain the object type, the next video frame from image capture 210 may be processed. If the video frame does include the object type, the video frame may be selectively passed to object detection 218. At block 216, image classification 212 may generate an object type confidence determination in addition to the binary indicator of the object presence or absence. For example, object type confidence determination 216 may include a confidence value between 0 and 1 that indicates the likelihood that the image classification algorithm has correctly identified the presence or absence of the object type in the video frame.

Object detection 218 may be executed for the selected video frame. For example, the video frame determined to contain at least one object of the object type of interest may be processed through an object detection algorithm configured to locate one or more objects of the object type. Object detection 218 may include computational image processing that detects objects of desired types or classes within an image and provides position information for those objects, such as bounding boxes. Object detection algorithms may include one-stage and two-stage methods, where one-stage methods, such as you-only-look-once (YOLO) models, single shot detector multibox (SSD Multibox), RetinaNet, etc. use a single pass through a deep neural network and two-stage methods, such as various region-based convolutional neural networks (R-CNN) models (Faster R-CNN, Mask R-CNN, Cascade R-CNN, etc.), use a selective search for regions of interest followed by processing each region (bounding box for the region of interest) through a neural network. Object detection 218 may generate position information 220 for one or more detected objects in the video frame. For example, for each object detected, the object detector may output location data, such as at least two corner coordinates, for bounding boxes that provide both a frame for the detected object image data and locate it within the larger video frame.

In some embodiments, position information 220 and/or other output from object detection 218 may trigger and/or be used in additional analytical processing. For example, position information 220 may be used as an input for object tracking 222, object recognition 224, and/or attribute detection 226. In some embodiments, an object crossing a line or exhibiting other location conditions may trigger further processing and/or extracted object data, such as the portion of the image within an object frame may be passed as an input. In some embodiments, the video data with the detected object may be further processed within the video camera, such as processing an object tracking algorithm that operates in conjunction with object detection 218, or may be forwarded to an analytics engine in a network video recorder or network video server for deeper processing, such as object recognition 224 and/or attribute detection 226. Position information may be provided as metadata to the video stream for use by other system components.

In some embodiments, image classification may be further used to support operation of object detection 218 and/or object tracking 222. For example, image classification may be used to verify determinations made by other image processing algorithms and identify object detection failures: false positives or false negatives. Image classification algorithms may be more reliable than object detection 218 and/or object tracking 222 for determining the presence or absence of an object. In some embodiments, image classification may be used to verify object detection decisions even if image classification was not used as a trigger for that object detection (e.g., without blocks 212, 214, and 216).

In some embodiments, verification with image classification may be used for object detection 218. For example, object detection 218 may generate object confidence determination 228, such as a detected object confidence value. In some embodiments, system 200 may be configured with a verification threshold. At block 230, one or more detected object confidence values may be compared to one or more threshold values, including the verification threshold. For example, the confidence value may be a value from 0 to 1, with 1 representing certainty of the object detection, and the verification threshold may be a decimal value under which the detected object should be verified. If the verification threshold is met (e.g., the confidence value is less than the threshold value), then the video frame or object image data may be forwarded to image classification 232. In some embodiments, the verification threshold may be different than the detection quality threshold used by the system to determine whether position information 220 is returned for use in further processing. Image classification 232 may determine, at block 234, whether the image contains the detected object or not. For example, the video frame may be processed through an image classification model in response to the threshold being met. If, according to image classification 232, the video frame contains the detected object, object detection 218 may be confirmed at block 236. If, according to image classification 232, the video frame does not contain the detected object, object detection 218 may have been in error and object detection failure may be reported at block 238. For example, system 200 may report a detection failure event to a user, aggregate such events to report on object detection performance, and/or trigger retraining or other re-tuning of the object detector.

In some embodiments, verification with image classification may be used for object tracking 222. For example, object tracking 222 may be initiated for a detected object and object tracking 222 may check each subsequent video frame in the video stream to confirm that the object is still in the frame and/or determine the changing position of the detected object (if moving). In some embodiments, object tracking 222 may support an auto-tracking feature where a video camera's field of view is automatically adjusted to keep the object in frame using the camera's PTZ or ePTZ capabilities. Object tracking 222 may be configured to generate position information and/or determine the object status for each subsequent video frame until the object is no longer detected and generates an object exit event. For example, at block 240, object tracking 222 may evaluate whether an object disappears (or is no longer detected) in each subsequent video frame. If the object has not disappeared (object and/or position are detected in the video frame), then object tracking 222 process the next sequential video frame. If the object has disappeared, the video frame that would normally trigger an object exit event is passed to image classification 242 to verify that the previously detected object is no longer present in the video frame. Image classification 242 may determine, at block 244, whether the image contains the detected object or not. For example, the video frame may be processed through an image classification model in response to the initial object exit determination by object tracking 222. If, according to image classification 242, the video frame contains the detected object, the initial exit event determination may be in error and, at block 236, an object detection failure may be reported. For example, system 200 may report object detection failures to a user, aggregate such events to report on object tracker performance, and/or trigger retraining or other re-tuning of the object tracker. If, according to image classification 242, the video frame does not contain the detected object, the initial exit event determination may be confirmed and the object exit event may be reported at block 248.

Figure 3:
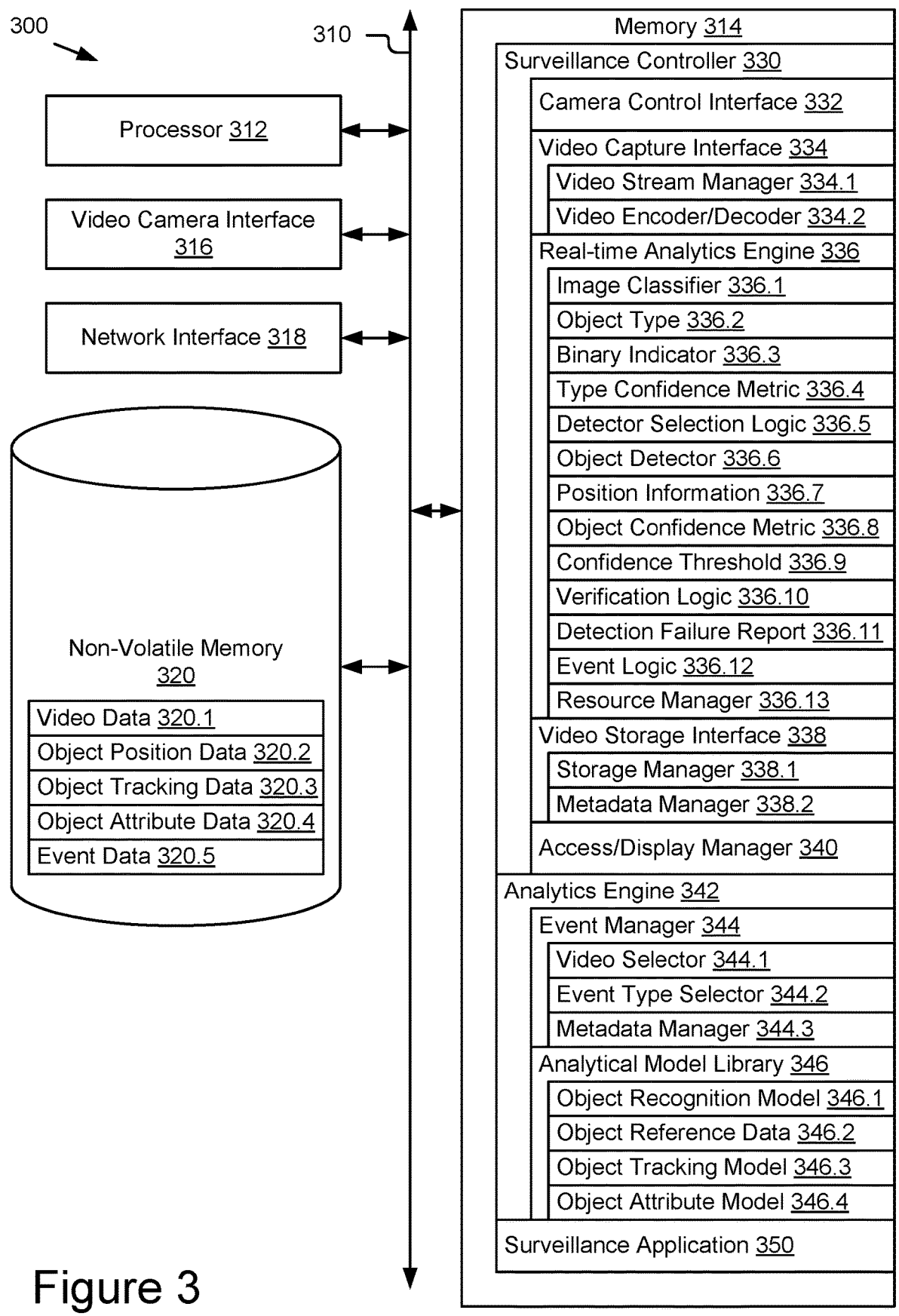
FIG. 3 schematically illustrates some elements of the computer-based surveillance system of FIG. 1.

FIG. 3 schematically shows selected modules of a surveillance system 300 configured for using one or more image classifiers in combination with one or more object detectors. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170. For example, a video camera and its embedded or attached compute resources may be configured with some or all functions of video surveillance controller 330 to provide real-time video stream analysis in a distributed fashion at the edge of surveillance system 300 before selectively providing the video stream and generated metadata to other system components, such as a network video recorder or user device, for additional analytics and/or use in a surveillance application.

Surveillance system 300 may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element. In some embodiments, processor 312 and memory 314 may be compute resources available for execution of logic or software instructions stored in memory 314 and computation intensive tasks, such as real-time analytics engine 336, may be configured to monitor and share these resources.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data. Video camera interface 316 may not be included in some systems, particularly where surveillance controller 330 is substantially embodied in "smart cameras" and network interface 318 provides substantially all communication with other system components.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by a network video recorder for storing and accessing video data.

Surveillance system 300 may include a plurality of modules or subsystems that are stored and/or instantiated in memory 314 for execution by processor 312 as instructions or operations. For example, memory 314 may include a surveillance controller 330 configured to control at least one video camera, capture and store video streams from that camera, and enable user access, such as through surveillance application 350. Memory 314 may include an analytics engine configured to analyze video data to detect events for use by surveillance controller 330 and/or surveillance application 350. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with analytics engine 342 and surveillance application 350. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engine 342 and presentation of video streams and video event alerts to a user through surveillance application 350.

In some embodiments, surveillance controller 330 may be an embedded firmware application and corresponding hardware in or directly associated with a video camera or video camera array. In some embodiments, the functions for surveillance controller 330 may be divided among one or more video cameras and a network video recorder, network video server, and/or user device.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a real-time analytics engine 336, a video storage interface 338, and an access and display manager 340.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, object detection, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, analytics engine 342, and/or surveillance application 350 to associate video data with the camera from which it was received. In some embodiments, camera control interface 332 may include one or more control features within a video camera to allow surveillance controller 330 to access camera control systems, such as PTZ motor controls, lens focus, filters, and other camera subsystems.

Video capture interface 334 may include camera interface protocols and a set of functions, parameters, and data structures for receiving video streams from associated cameras and/or video image sensors. For example, video capture interface 334 may include video data channels and related data buffers for managing a plurality of camera video data streams. In some embodiments, each video camera may be allocated a dedicated video channel for continuously and/or selectively sending its video stream to video capture interface 334. For example, received video streams may be buffered by video capture interface 334 before being streamed to real-time analytics engine 336, video storage interface 338, analytics engine 342, and access/display manager 340. In some embodiments, video capture interface 334 may receive or generate camera video metadata describing the camera video format, time and location information, and event or condition tags based on on-board camera analytics.

In some embodiments, video capture interface 334 may include a video stream manager 336.1 configured to identify and manage the plurality of video streams being received from the cameras or video image sensors within a camera. For example, video stream manager 336.1 may manage video buffer allocation and space, processing of video streams from a camera video format or raw video format to another video format, directing buffered video frames through real-time analytics engine 336, and flushing of buffered video to storage through video storage interface 338 and/or for display via access/display manager 340. In some embodiments, video stream manager 336.1 may selectively send video streams to analytics engine 342 for analysis and/or provide a notification to analytics engine 342 of the availability and storage location of video data for analysis in non-volatile memory 320 (as determined by video storage interface 338). In some embodiments, video stream manager 334.1 may include configurable video paths. For example, the real-time analytics path (through real-time analytics engine 336), the storage path (through video storage interface 338), the display path (through access/display manager 340), and/or the analytics path (through analytics engine 342) may each be configured for specific processing, priority, and timing, including selective allocation of compute resources to support each video path.

In some embodiments, video stream manager 334.1 may be configured to use encoder/decoder 334.2 to encode video data, such as raw video data, in a desired video format. For example, encoder/decoder 334.2 may receive raw video frames in accordance with a defined frame rate and resolution to generate a time-dependent video stream that may be further processed according to a selected video codec and corresponding compression scheme. In some embodiments, encoder/decoder 334.2 may be used to decode camera video streams in a first (camera) video format and re-encode them in one or more other formats. For example, video stream manager 334.1 may use encoder/decoder 334.2 to change the resolution, image size, frame rate, codec, compression factor, color/gray-scale, or other video format parameters.

Real-time analytics engine 336 may include one or more video analytics models and a set of functions, parameters, and data structures for processing video streams from associated cameras and/or video image sensors to enable real-time or near-real-time response to objects in the video stream. In some embodiments, real-time analytics engine 336 may include at least one image classifier 336.1 and at least one object detector 336.6 configured to determine the presence in a video frame of an object type 336.2 of interest. By including image classifier 336.1 and object detector 336.6 in real-time analytics engine 336, real-time analytics engine 336 may use improved object detection accuracy and reduced compute resources from image classifier 336.1 to supplement the operation of object detector 336.6. In some embodiments, image classifier 336.1 and object detector 336.6 may be configured for the same object type 336.2, sometimes referred to as an object class, such as people, faces, cars, license plates, etc. For example, the neural networks of image classifier 336.1 and object detector 336.6 may be trained with similar data sets targeting object type 336.2. In some embodiments, real-time analytics engine 336 may be configured for a plurality of object types 336.2 and include image classifiers and object detectors trained to each object type.

In some embodiments, image classifier 336.1 may be configured to return a binary indicator 336.3 and an object type confidence metric 336.4. For example, image classifier 336.1 may be configured for a human face object type and trained on a data set for human face detection. Image classifier 336.1 may process the dimensional features of the entire video frame to determine whether there are any occurrences of object type 336.2. If one or more data objects of object type 336.2, such as human faces, are present in the video frame, image classifier 336.1 may return a binary indicator value of 1, indicating that the object is present. If no data objects of object type 336.2 are detected in the video frame, image classifier 336.1 may return a binary indicator value of 0. While 1 and 0 are the most common binary indicators used, other flag or state values may be used. Similarly, if multiple image classifiers are operating, a binary indicator for each object type may be determined. In some embodiments, a positive binary indicator may be used to return a tag or key-word representing the object type for each object type detected. Image classifier 336.1 may also return a confidence score for the binary indicator returned. For example, image classifier 336.1 may return an object type confidence value between 0 and 1 (0-100%), corresponding to a percentage of certainty generated by the machine learning model. In some embodiments, a classified video data frame may be passed from image classifier 336.1 to object detector 336.6, analytics engine 342, and/or another function for further processing.

In some embodiments, detector selection logic 336.5 may include logical rules for determining whether and which object detector 336.6 may be invoked based on the output of image classifier 336.1. In a simple configuration with one image classifier matched to one object detector for the same object type, a positive result from image classifier 336.1 indicating that the object type is present in the video frame may initiate processing the same or a subset of subsequent video frames through object detector 336.6. A negative result from image classifier 336.1 indicating that the object type is not present in the video frame may not initiate or bypass object detector 336.6 to conserve compute resources. In embodiments with multiple object classifiers and object detectors, more complex logic may map positive results for one or more object types to selection of one or more appropriate object detectors. In some embodiments, detector selection logic 336.5 may also consider available compute resources and/or user configured schedules and priorities for selecting and initiating object detectors. For example, analytics manager 336.14 may include a configuration schedule that determines times when one or more object detectors should or should not be initiated and/or a priority of object classes where only the highest priority object detector is initiated in response to multiple object types being determined by the object classifiers.

In some embodiments, object detector 336.6 may be configured to return position information 336.7 and an object confidence metric 336.8 for each instance of the object detected in the video frame. For example, object detector 336.6 may use a single pass or double pass method and a trained neural network model to detect any number of objects of object type 336.2 and return a bounding box (or corresponding coordinates) for each object detected. In some embodiments, position information 336.7 may include position information values, such as the coordinates for a bounding box, in an output array or similar data structure for a plurality of detected objects. For example, object boundary data, such as two horizontal positions and two vertical positions to define a boundary box within the video frame, may be returned with a delimiter between each detected object. If multiple object detectors are operating, position information 336.7 for each object instance of each object type may be determined and corresponding position values returned. In some embodiments, each object detector may return a tag or key-word representing the object type appended to position information 336.7. Object detector 336.6 may also return object confidence metric 336.7 for each object detected and corresponding set of position information 336.7 returned. For example, object detector 336.6 may return an object detected confidence value between 0 and 1 (0-100%), corresponding to a percentage of certainty generated by the machine learning model.

In some embodiments, object detector 336.6 may have one or more associated object confidence thresholds 336.9 for evaluating detected object confidence metric 336.8 for each object detection event and corresponding object(s) detected. For example, object confidence threshold 336.9 may include an object detection threshold, below which the presence of an object is not treated as sufficiently certain to raise an object detection event, such as 50% reliability. In some embodiments, image classifier 336.1 may be used for verification of the presence or absence of an object where the results of object detector 336.6 are of marginal confidence.

Real-time analytics engine 336 may include verification logic 336.10 for determining various conditions in which an object detection outcome should be verified using image classifier 336.1. For example, verification logic 336.10 may be configured with logical rules and corresponding thresholds or other conditions for determining when a positive or negative object detection outcome by object detector 336.6 should be verified. In some embodiments, verification logic 336.10 may include one or more rules for detecting model failures. For example, where object detector 336.6 supports an object tracking model, such as a video camera auto tracker function, the object tracking model may generate an object exit event for the first frame in which object detector 336.6 does not detect the object being tracked. Verification logic 336.10 may initiate image classifier 336.1 to verify that the object is no longer present in the video frame corresponding to the exit event. In another example, where object detector 336.6 returns object confidence metric 336.8 meeting a verification confidence threshold 336.9, verification logic 336.10 may initiate image classifier 336.1 to verify whether or not the detected object is in the frame. Thus, despite a low confidence value, a positive result by image classifier 336.1 may provide additional confidence in the detected object or a negative result may be treated as a confirmation that the detected object is in error and should not be returned.

In some embodiments, verification logic 336.10 and image classifier 336.1 may support reporting of detection errors made by object detector 336.6. For example, in a case where object detector 336.6 did not detect an object (such as prematurely detecting an object exit for an object tracker) and image classifier 336.1 does, verification logic 336.10 may generate a detection failure report 336.11. In another example, in a case where object detector 336.6 detected an object (perhaps with a marginal confidence metric value) and image classifier 336.1 does not, verification logic 336.10 may generate a detection failure report 336.11. In some embodiments, the object detection threshold (the confidence metric necessary for object detector 336.6 to return position information) may be less than the verification threshold used by verification logic 336.10. For example, the object detection threshold may be 0.5 (confidence metric>0.5) for using the output of object detector 336.6 but the verification threshold may be lower, such as 0.3 (0.5>confidence metric>0.3), for triggering verification using image classifier 336.1 to determine detection failures. These false detection events, other failure cases, and detection failure reports may be configured to have both immediate consequences, such as overriding a false exit event or detection event, and longer-term results, such as aggregation for and/or initiation of retraining of object detector 336.6.

In some embodiments, event logic 336.12 may include logical rules configured to trigger video camera control, video storage, analytics, and/or user notification responses to real-time analytics. For example, event logic 336.12 may be embodied in a rules engine that receives and/or maintains state information for triggers and outputs of camera control interface 332, video capture interface 334, real-time analytics engine 336, video storage interface 338, and/or access/display manager 340 to determine system responses to generated video streams and related conditions and analysis. In some embodiments, event logic 336.12 may be configured to generate alerts and/or notifications in response to a set of predefined event conditions. For example, when an object of a particular object type is detected in the video stream, an object alert may be generated and sent to a user through access/display manager 340 and/or surveillance application 350. Similarly, in an object tracking context, an object exit event may trigger an object exit notification to the user. In some embodiments, event logic 336.12 may determine events that are used as triggers for operations by other systems. For example, an object detected event may determine a change in how raw video data is processed by video capture interface (such as increasing resolution of the resulting encoded video data), how the video cameras are positioned by camera control interface 332 (such as using PTZ control to change the field of view), where the resulting video is stored by video storage interface 338, and/or how access privileges are assigned for use by access/display manager 340. In some embodiments, event logic 336.12 may generate an event notification and send it over a network to surveillance application 350 to automatically execute one or more user-defined display, alert, system control, deep analytics, and/or metadata operations.

In some embodiments, resource manager 336.13 may include or access a subsystem for monitoring compute resources, such as processor operations, memory usage, and related parameters (processing threads, active services, network bandwidth, etc.), and determining what real-time analytics may be performed. For example, resource manager 336.13 may monitor current and maximum processor operations and current and maximum memory allocations to determine whether and how image classifier 336.1 and/or object detector 336.6 may be used to process incoming video data in a video camera subsystem or surveillance controller 330. In some embodiments, image classifier 336.1 may be selected and configured to use less compute resources (processor resources and/or memory resources) than object detector 336.6. For example, image classifier 336.1 may be configured to use less than 1 giga-floating point operation per second (GFLOP) to analyze a video frame, while object detector 336.6 may be configured to use more than 2 GFLOPs and as high as 60 GFLOPs or more to analyze the same video frame.

In some embodiments, resource manager 336.13 may be configured to manage switching among using image classifier 336.1, object detector 336.6, and various combinations (such as selective use of object detector 336.6 following image classifier 336.1 detecting an object type or image classifier 336.1 following object detector 336.6 to provide verification of marginal confidence metrics). For example, resource manager 336.13 may be configured to determine the available compute resources, such as available processor operations and/or available memory, and compare against one or more allocation thresholds to determine which real-time analytics are performed, such as image classification, object detection, or one of the combined processes. In some embodiments, allocation thresholds and/or other parameters may be configured by a user for use by resource manager 336.13 to determine which real-time analytics to employ. For example, a user may define a schedule for each camera to determine which analytics path should be used, such as image classification with selective use of object detection during high-traffic or low importance times and object detection with image classification verification at lower-traffic or high-risk times. In some embodiments, resource manager 336.13 may configure the real-time analytics path to activate image classifier 336.1 for all incoming video data (always active or based on other camera triggers, such as visual tripwire or motion detection) and object detector 336.6 may be triggered responsive to both image classifier 336.1 detecting an object type and available compute resources being above an allocation threshold that assures use of object detector 336.6 will not otherwise compromise operation of the video camera or other system components.

Video storage interface 338 may include storage interface protocols and a set of functions, parameters, and data structures for managing storage of video data in non-volatile memory 320, such as storage devices and/or network video storage, for later retrieval and use by access/display manager 340 and/or analytics engine 342. For example, video storage interface 338 may write camera video stream data from video data buffers and/or storage path video data from video capture interface 334 to non-volatile memory 320 as video data 320.1. In some embodiments, video storage interface 338 may include a storage manager 338.1 configured to manage video storage space in non-volatile memory 320 in accordance with one or more data retention and/or data archiving schemes. For example, surveillance system 300 may support continuous and/or triggered recording of video data from associated cameras and storage manager 338.1 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. Video storage interface 338 may also include a metadata manager 338.2 to receive and store video metadata as tags or metadata tracks in the video data or in an associated metadata table, file, or similar data structure associated with the corresponding video data objects. In some embodiments, metadata manager 336.2 may be configured to include object position data 320.2, object tracking data 320.3, object attribute data 320.4, and/or event data 320.5. For example, object position data 320.2 may include bounding box coordinates and object type tags for each object detected within a video stream, object tracking data 320.3 may include entry and exit time values for each object detected within a video stream, object attribute data 320.4 may include color, size, character recognition, object subtypes, etc., and event data may include timestamps and event types for event occurrences in the video stream.

Access/display manager 340 may include APIs and a set of functions, parameters, and data structures for displaying video from video capture interface 334 and/or video storage interface 338 to a user display application, such as surveillance application 350. For example, access/display manager 340 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 340 may maintain an index of real-time/near real-time video streams and/or stored or archived video streams that are available for access by surveillance application 350. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Access/display manager 340 may be configured to support surveillance application 350 when instantiated in the same computing device as surveillance controller 330, directly attached to the computing device hosting surveillance controller 330, and/or via a network within a LAN, WAN, VPN, or the internet. In some embodiments, access/display manager 340 may provide selective access to user video streams allocated by video capture interface 334 to the user video path.

Analytics engine 342 may include interface protocols, functions, parameters, and data structures for analyzing video data to detect video events, add them to video metadata, and/or raise alerts, such as through surveillance application 350. For example, analytics engine 342 may be an embedded firmware application and corresponding hardware in a network video recorder configured for local analysis of video data captured from associated video cameras and may be integral to or accessible by surveillance controller 330. In some embodiments, analytics engine 342 may run on a separate computing device from surveillance controller 330, such as a video camera with analytics capabilities, a dedicated analytics appliance, data storage system with analytics capabilities, or a cloud-based analytics service. In some embodiments, analytics engine 342 may operate in real-time or near real-time on video data received by video capture interface 334, delayed processing of video data stored by video storage interface 338, and/or a combination thereof based on the nature (and processing requirements) of the video events, volume of video to be processed, and other factors. In some embodiments, analytics engine 342 may include some or all of real-time analytics engine 336 and/or provide additional support for real-time analytics engine 336. In some embodiments, surveillance system 200 may comprise a plurality of analytics engines configured for a particular type of event and corresponding event detection algorithm or model.

In some embodiments, analytics engine 342 may include a plurality of hardware and/or software modules configured to use processor 312 and memory 314 to handle or manage defined operations of analytics engine 342. For example, analytics engine 342 may include an event manager 344 and analytical model library 346. Analytics engine 342 may be configured to run one or more event detection algorithms for determining, tagging, and/or initiating alerts or other actions in response to detected video events. In some embodiments, analytics engine 342 may be configured to tag or build metadata structures that map detected events to time and image location markers for the video stream from which they are detected. For example, analytics engine 342 may use motion, tripwire, object recognition, facial recognition, audio detection, speech recognition, and/or other algorithms to determine events occurring in a video stream and tag them in a corresponding metadata track and/or separate metadata table associated with the video data object.

Event manager 344 may include storage interface and/or buffer interface protocols and a set of functions, parameters, and data structures for processing target video streams for predefined event types and updating or adding metadata parameters describing the detected video events. For example, event manager 344 may be configured to process all incoming video streams for surveillance controller 330 and/or selectively process video data based on user selections (through surveillance application 350) or metadata criteria received from the video camera or video capture interface 334. In some embodiments, event manager 344 may include a video selector 344.1 configured to select target video streams or video data sets for analysis. For example, video selector 344.1 may identify a real-time video stream for near real time analysis or a bounded video data set, such as video with a specified camera identifier and timestamps between beginning and ending time markers and/or including a defined set of metadata parameters. Event manager 344 may include an event type selector 344.2 configured to determine one or more event types to be detected from the selected video data. For example, an analytics configuration may be configured to analyze the selected video stream for a predefined set of motion detection, tripwire detection, object recognition, facial recognition, audio detection, speech recognition, and/or similar video event types. Each event type may map or correspond to an analytical model type, set of parameters, and one or model weights for defining an event detection algorithm stored in analytical model library 346 for use by analytics engine 342 to detect potential video events.

Analytical model library 346 may include an API and set of functions, parameters, and data structures for storing a plurality of analytical models for use by analytics engine 342 in processing video data. For example, analytical model library 346 may include a plurality of trained analytical models and corresponding event detection algorithms for different event types, target object classes (e.g., cars, license plates, equipment, people, etc.), and/or training conditions. Each analytical model may include a set of base equation(s) for the analytical model type, set of target parameters, and one or model weights that determine the event detection algorithm that will be used for the event detection processing.

In some embodiments, analytical model library 346 may include at least one object recognition model 346.1. For example, a facial recognition model may apply a set of weighted parameter values representing the relationships among sets of feature vectors for comparison with reference data (such as sets of feature vectors for known faces) and determination of a probabilistic reliability or correlation factor. Analytical model library 346 may include or access object reference data 344.2 for matching detected objects with previously identified (or recognized) reference objects. For example, the facial recognition model may be applied to a reference database of relevant facial images and/or feature sets extracted therefrom to provide facial reference data. In some embodiments, for any given detected object, object recognition model 346.1 may return one or more recognized matches and a corresponding reliability value. For example, the facial recognition model may return one or more known individuals from the reference data and corresponding reliability values, assuming at least one match is found that meets a threshold reliability value.

In some embodiments, analytical model library 346 may include an object tracking model 346.3. For example, an object tracking model may take an initial object detection event and position information, such as an input set of bounding boxes, create a unique identifier for each detected object, and track each object as they move through the frame using an optical flow algorithm. In some embodiments, analytical model library 346 may include an object attribute model 346.4. For example, an object attribute detection model may take an object detection event, position information, and/or extracted object image data to further analyze characteristics of the detected object, such as color, configuration or object subtype, character recognition, etc., to generate additional tags or metadata describing attributes of the detected object. In some embodiments, analytics engine 342 may include or access training services for generating or updating analytical models in analytical model library 346 and training or re-training instances of those models using machine learning.

Surveillance application 350 may include interface protocols, functions, parameters, and data structures for providing a user interface for monitoring and reviewing surveillance video and/or managing surveillance system 300, such as through surveillance controller 330. For example, surveillance application 350 may be a software application running on a user device integral to, connected to, or in network communication with surveillance controller 330 and/or a hosting network video recorder. In some embodiments, surveillance application 350 may run on a separate computing device from surveillance controller 330, such as a personal computer, mobile device, or other user device. In some embodiments, surveillance application 350 may be configured to interact with APIs presented by access/display manager 340.

In some embodiments, surveillance application 350 may include a plurality of hardware and/or software modules configured to use processor 312 and memory 314 to handle or manage defined operations of surveillance application 350. For example, surveillance application 350 may include a video manager, an alert manager, and an analytics manager.

The video manager may include APIs and a set of functions, parameters, and data structures for navigating and displaying video streams from video cameras accessed through surveillance controller 330. For example, the video manager may include a graphical user interface and interactive controls for displaying lists, tables, thumbnails, or similar interface elements for selecting and displaying video streams for particular cameras, times, locations, and/or events. In some embodiments, the video manager may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, the video manager may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

The alert manager may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, the alert manager may include a plurality of preset alert conditions with associated event parameters and allow a user to enable and disable alert types and/or change associated event parameters. In some embodiments, the alert manager may be configured to operate in conjunction with event overlay function to overlay graphical elements representing detected events or event indicators on video streams displayed through the video manager. For example, detected motion, objects, or faces may be boxed or highlighted, tagged with relevant identifiers, or otherwise indicated in the video playback on the user device.

The analytics manager may include APIs and a set of functions, parameters, and data structures for selecting, training, and managing event detection algorithms. For example, the analytics manager may include a user interface to analytical model library 346 for one or more analytics engines 342. In some embodiments, the event detection algorithms may include a set of parameters and/or model weights that are preconfigured based on training data sets processed independent of surveillance system 300. For example, the analytics manager may include object detection algorithms for common objects, situations, and camera configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may interface directly with analytics engine 342 for selecting, training, managing, and using the event detection algorithms configured through the analytics manager. In some embodiments, the analytics manager may interface with access/display manager 340 for accessing and managing one or more analytics engines 342 and/or real-time analytics engine 336.

Figure 4:
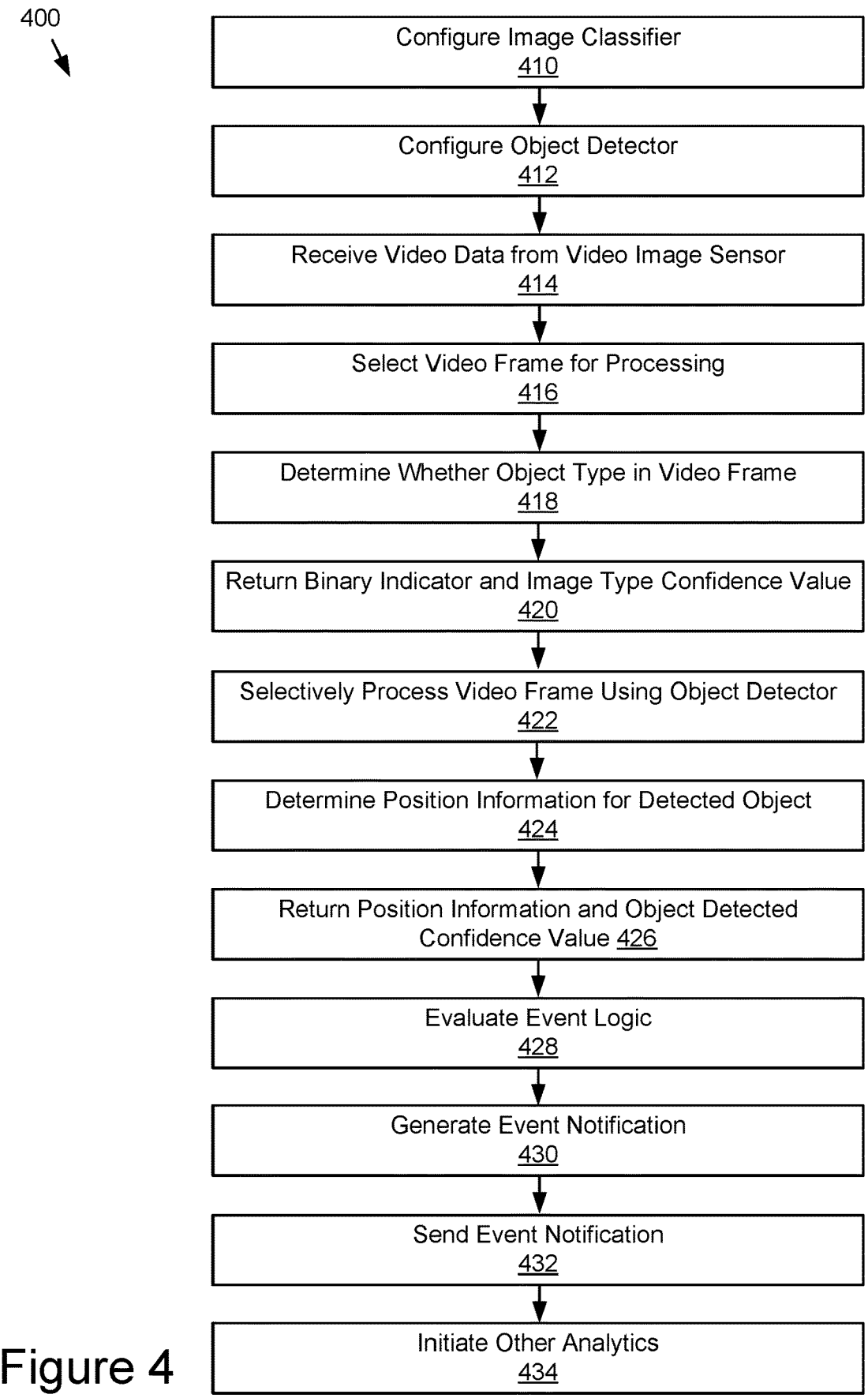
FIG. 4 is a flowchart of an example method of using an image classifier to control selective processing by an object detector.

As shown in FIG. 4, surveillance system 300 may be operated according to an example method of using an image classifier to control selective processing by an object detector, i.e., according to method 400 illustrated by blocks 410-434 in FIG. 4.

At block 410, an image classifier may be configured for real-time processing of video data generated by a video camera. For example, the image classifier may be selected and trained for a surveillance controller to classify video frames for an object type of interest using relatively low compute resources.

At block 412, an object detector may be configured for real-time processing of video data generated by the video camera. For example, the object detector may be selected and trained for the surveillance controller to detect instances of objects of the object type of interest using greater compute resources than the image classifier.

At block 414, video data may be received from a video image sensor. For example, the surveillance controller in a video camera may receive raw video data from one or more video image sensors in the camera.

At block 416, a video frame may be selected for processing. For example, the surveillance controller my buffer the most recently received video frame for processing through real-time analytics.

At block 418, whether the object type is present in the selected video frame may be determined. For example, the surveillance controller may analyze the selected frame using the image classifier to determine whether the object type is present in the video frame.

At block 420, a binary indicator and image type confidence value may be returned by the image classifier. For example, the image classifier may, based on the determination at block 418, return a 1 if the object type is present or 0 if the object type is not and provide an associated confidence metric related to that determination, such as a percentage of confidence.

At block 422, the video frame may be selectively processed by the object detector. For example, the surveillance controller may, responsive to the image classifier determining the object type is present, initiate the object detector to analyze the selected frame.

At block 424, position information for the detected object may be determined. For example, the object detector may determine one or more instances of the object type in the video frame and determine position information, such as coordinates for a bounding box.

At block 426, position information and object detected confidence values may be returned. For example, the object detector may, based on objects detected at block 424, return position information for each detected object and provide an associated confidence metric related to that determination.

At block 428, event logic may be evaluated. For example, the surveillance controller may evaluate event logic based on the object type, number of detected objects, position of the detected objects, and/or other video data parameters and/or state information to determine an event has occurred, such as an object detection event.

At block 430, an event notification may be generated. For example, the surveillance controller may generate an event notification corresponding to the event type and event handling logic that identifies the destination and content of the event notification.

At block 432, the event notification may be sent. For example, the surveillance controller may send the generated event notification (or event notifications) to one or more other system components, such as a surveillance application, for triggering additional system actions, such as display of an alert, corresponding video data, and/or another response to the event notification.

At block 434, additional analytics may be initiated. For example, the event notification at block 432 may include notification to one or more additional analytics engines for further processing of the video data, such as object recognition, object tracking, or object attribute determination.

Figure 5:
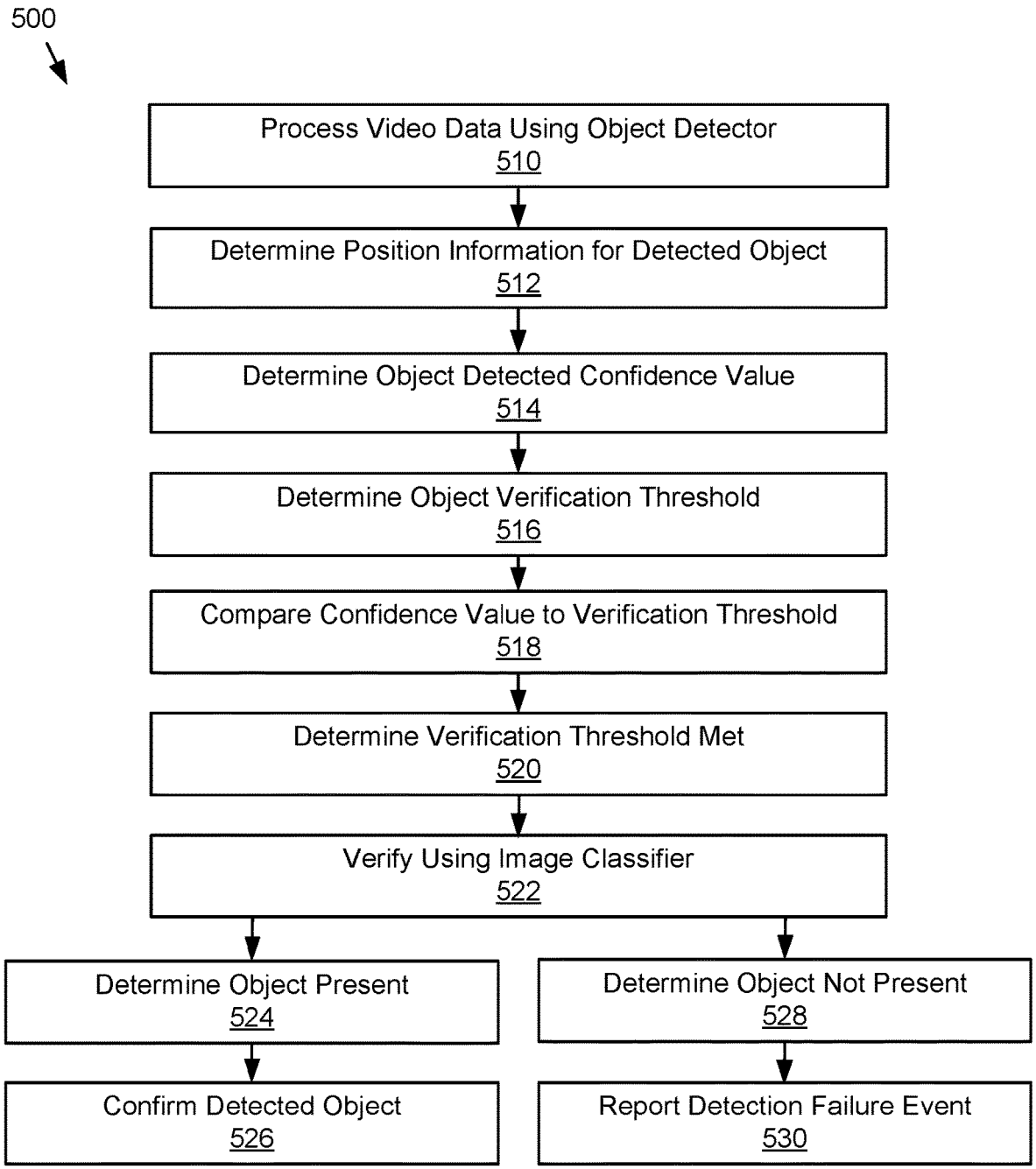
FIG. 5 is a flowchart of an example method of using an image classifier to verify the output of an object detector.

As shown in FIG. 5, surveillance system 300 may be operated according to an example method for using an image classifier to verify the output of an object detector, i.e., according to method 500 illustrated by blocks 510-530 in FIG. 5.

At block 510, video data may be processed using an object detector. For example, a surveillance controller may have sufficient compute resources to process incoming video data through the object detector during certain user-scheduled time periods (without first processing it through the image classifier).

At block 512, position information for the detected object may be determined. For example, the object detector may determine one or more instances of the object type in the video frame and determine position information, such as coordinates for a bounding box.

At block 514, an object detected confidence values may be determined. For example, the object detector may, for each object and corresponding position information determined at block 512, determine an associated confidence metric, such as a percentage confidence value from the neural network algorithm in the object detector.

At block 516, an object verification threshold may be determined. For example, the surveillance controller may be configured with an object verification threshold corresponding to confidence metrics falling below a certain level, such as 80%, 50%, or 30%, dependent on the acceptable risk of error, sometimes set be the user.

At block 518, the object detected confidence value may be compared to the object verification threshold. For example, the surveillance controller may compare each object detected confidence value determined at block 514 to the object verification threshold determined at block 516 to see whether the confidence value meets (falls below) the verification threshold.

At block 520, the verification threshold may be met. For example, the surveillance controller, based on the comparison at block 518, may determine that the object verification threshold has been met for one or more detected object.

At block 522, the detected object may be verified using an image classifier. For example, the surveillance controller may initiate the image classifier to process the same video frame to determine whether or not the object type is present according to the image classifier model.

At block 524, the object is determined to be present and verified by the image classifier. For example, the image classifier may return a positive result for the object type, suggesting that the object detector accurately detected the object.

At block 526, the detected object may be confirmed. For example, the surveillance controller may generate an object detection event despite a marginal confidence value from the object detector.

At block 528, the object is determined not to be present and not verified by the image classifier. For example, the image classifier may return a negative result for the object type, suggesting that the object detector did not accurately detect the object.

At block 530, a detection failure event may be reported. For example, the surveillance controller may generate a detection failure event and corresponding notification that may be used to retrain the object detector and improve future object detections.

Figure 6:
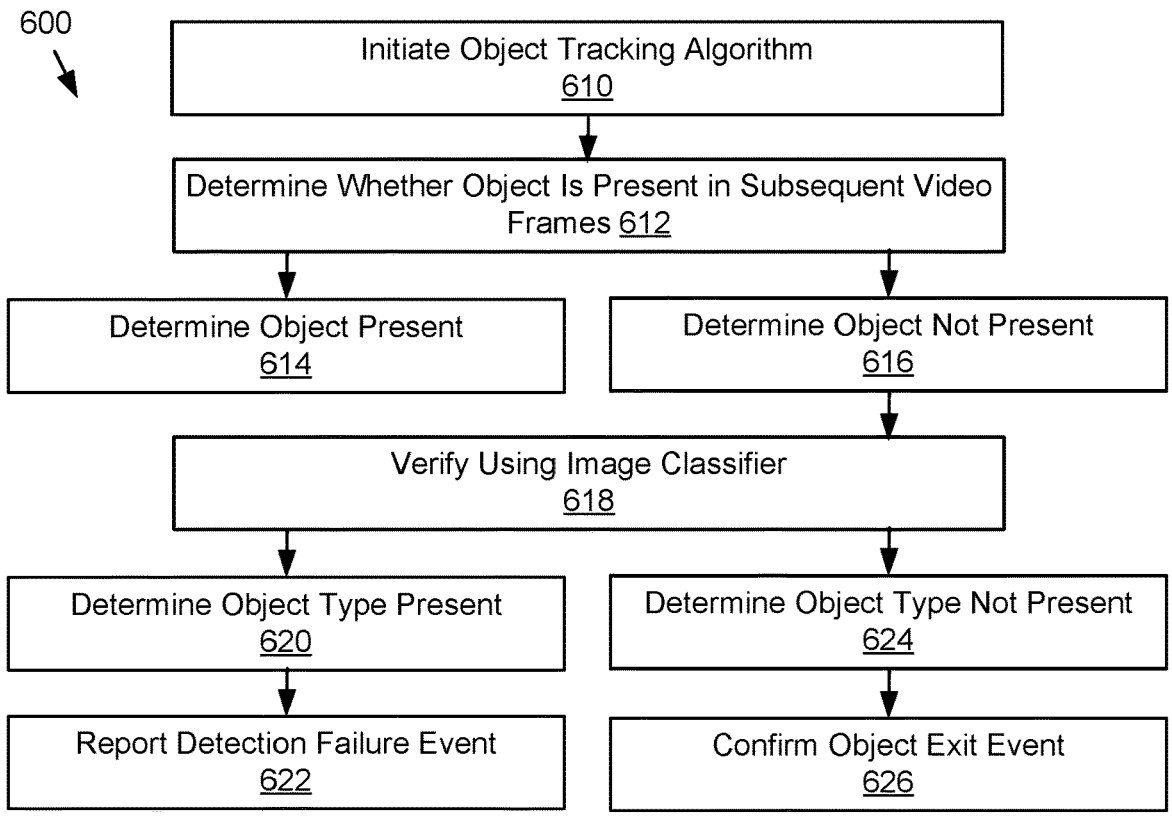
FIG. 6 is a flowchart of an example method of using an image classifier to verify the output of an object tracking algorithm.

As shown in FIG. 6, surveillance system 300 may be operated according to an example method for using an image classifier to verify the output of an object tracking algorithm, i.e., according to method 600 illustrated by blocks 610-626 in FIG. 6.

At block 610, an object tracking algorithm may be initiated. For example, a surveillance controller may use an object detector to detect an object to be tracked and use the object type and position information as an input to the object tracking algorithm.

At block 612, whether the detected object is present in subsequent video frames may be detected. For example, the surveillance controller may process subsequent video frames through the object tracking algorithm.

At block 614, the object may be determined to be present in a subsequent video frame. For example, the object tracking algorithm may continue to detect and track the detected object in each subsequent video frame and return to block 612 to continue processing.

At block 616, the object may be determined not to be present in a subsequent video frame. For example, the object tracking algorithm may eventually fail to detect the previously detected object in a subsequent video frame and generate an object exit event indicating that the object has left the frame.

At block 618, the object exit may be verified using an image classifier. For example, responsive to the (preliminary) exit event generated by the object tracking algorithm, the surveillance controller may process the video frame from which the exit was detected through the image classifier for the object type that was being tracked.

At block 620, the object type may be determined to be present. For example, the image classifier may return a positive result for the object type of the detected object.

At block 622, a detection failure event may be reported. For example, the surveillance controller may use the object classifier result to override the exit event and/or report a detection failure event that can be used to retrain the object detector and/or object tracking algorithm and improve future object tracking.

At block 624, the object type may be determined to not be present. For example, the object classifier may return a negative result for the object type of the detected object.

At block 626, the object exit event may be confirmed or verified. For example, the surveillance controller may use the object classifier result to verify the exit event determined by the object tracking algorithm and may respond to the verified object exit event by generating and sending appropriate event notifications to the user and/or other system components.

Figure 7:
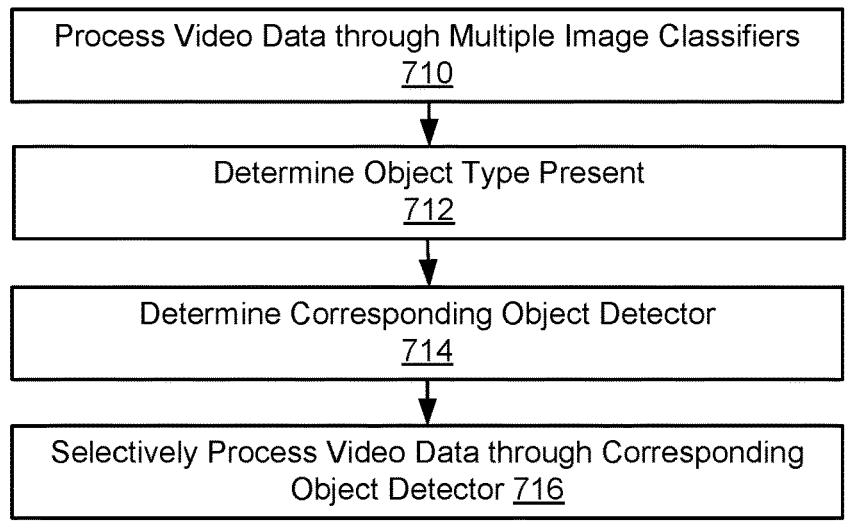
FIG. 7 is a flowchart of an example method of using multiple image classifiers to control selective processing by multiple object detectors.

As shown in FIG. 7, surveillance system 300 may be operated according to an example method for using multiple image classifiers to control selective processing by multiple object detectors, i.e., according to method 700 illustrated by blocks 710-716 in FIG. 7.

At block 710, video data may be processed through multiple image classifiers. For example, a surveillance controller may include or access a plurality of image classifiers trained for different object types, using serial or parallel processing.

At block 712, at least one object type is determined to be present. For example, at least one of the image classifiers may return a positive result for their corresponding object type to the surveillance controller.

At block 714, a corresponding object detector may be determined. For example, the surveillance controller may select an object detector configured for the same object type as the image classifier that returned the positive result.

At block 716, video data may be selectively processed through the corresponding object detector. For example, the surveillance controller may initiate processing of the video frame that generated the positive result to the corresponding object detector and may otherwise process the video data using the image classifier and object detector pair (corresponding to the same object type) as described above regarding methods 400, 500, and 600 in FIGS. 4-6.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a video image sensor; and
a controller comprising:
  a plurality of image classifiers, wherein each image classifier of the plurality of image classifiers is configured for a different object type; and
  a plurality of object detectors, wherein each object detector of the plurality of object detectors is configured for a different object type;
wherein the controller is configured to:
  receive video data from the video image sensor, wherein the video data includes a time-dependent video stream of video frames captured by the video image sensor;
  process the video data through the plurality of image classifiers to determine at least one object type for a first frame of the video data;
  determine a corresponding object detector from the plurality of object detectors, the corresponding object detector configured to detect a first object type corresponding to the at least one object type determined by the plurality of image classifiers;

determine, using the corresponding object detector, position information for a detected object in the video data having the first object type; and send, over a network, an event notification to a video surveillance application.

2. The system of claim 1, wherein:
the controller comprises:
a processor;
a memory;
the plurality of image classifiers, stored in the memory for execution by the processor, and configured to use:
a first set of processor resources; and
a first set of memory resources; and
the plurality of object detectors, stored in the memory for execution by the processor, and configured to use:
a second set of processor resources; and
a second set of memory resources;
the first set of processor resources are less than the second set of processor resources; and
the first set of memory resources are less than the second set of memory resources.

3. The system of claim 1, further comprising:
a video camera housing, wherein the video camera housing encloses:
the video image sensor;
the controller; and
a network interface configured to communicate with the network.

4. The system of claim 1, wherein:
the plurality of image classifiers is configured to:
process each video frame in the time-dependent video stream; and
return a binary indicator of the first object type from a corresponding image classifier for the first object type; and
the corresponding object detector is configured to:
selectively process, responsive to the corresponding image classifier determining that the first object type is present, a subset of video frames to determine the position information for the detected object; and
return position information values for the detected object.

5. The system of claim 4, wherein:
the corresponding image classifier is further configured to return an image type confidence value for the first object type; and
the corresponding object detector is further configured to return an object detected confidence value for the detected object.

6. The system of claim 5, wherein the controller is further configured to:
compare the object detected confidence value to an object verification threshold;
responsive to the object detected confidence value meeting the object verification threshold, verify, using the corresponding image classifier, the first object type; and
responsive to the verification of the first object type being negative, report a detection failure event.

7. The system of claim 1, wherein the controller is further configured to:
initiate, responsive to the position information for the detected object, an object tracking algorithm for the detected object to process subsequent video frames of the time-dependent video stream;

determine, using the object tracking algorithm, whether the detected object is present in the subsequent video frames of the time-dependent video stream;
responsive to the object tracking algorithm determining an object exit event, verify, using the plurality of image classifiers, the first object type in a video frame corresponding to the object exit event; and
responsive to verifying that the first object type is present in the video frame corresponding to the object exit event, report a detection failure event.

8. The system of claim 1, wherein:
the plurality of image classifiers is configured to process the video data from the video image sensor as video frames are received by the controller; and
the plurality of object detectors is configured to selectively process the video data responsive to the image classifier determining that the first object type is present in a classified video data frame.

9. The system of claim 1, wherein each image classifier of the plurality of image classifiers is configured to process the first frame through an image classification algorithm configured to comprehend the first frame as a whole to determine a presence or absence of a corresponding object type for that image classifier.

10. The system of claim 1, wherein the controller is further configured to send the position information and image data for the detected object for further processing by an analytics engine using a model selected from:
an object recognition model;
an object tracking model; and
an attribute detection model.

11. A computer-implemented method, comprising:
receiving video data from a video image sensor, wherein the video data includes a time-dependent video stream of video frames captured by the video image sensor;
determining, using a plurality of image classifiers, whether a first object type is present in a first frame of the video data, wherein each image classifier of the plurality of image classifiers is configured for a different object type;
determining a corresponding object detector from a plurality of object detectors, wherein:
each object detector of the plurality of object detectors is configured for a different object type; and
the corresponding object detector is configured to detect an object type corresponding to the first object type determined by the plurality of image classifiers;
determining, using the corresponding object detector, position information for a detected object in the video data having the first object type; and
sending, over a network, an event notification to a video surveillance application.

12. The computer-implemented method of claim 11, further comprising:
configuring a controller to:
use a first set of compute resources for the plurality of image classifiers; and
use a second set of compute resources for the plurality of object detectors, wherein the first set of compute resources is less than the second set of compute resources.

13. The computer-implemented method of claim 12, wherein:
the controller comprises compute resources including a processor and a memory;

the plurality of image classifiers and the plurality of object detectors are stored in the memory for execution by the processor;

the controller executes:
  receiving the video data from the video image sensor;
  determining whether the first object type is present;
  determining position information for the detected object; and
  sending the event notification; and the controller, the video image sensor, and a network interface for communicating over the network are disposed within a video camera housing.

14. The computer-implemented method of claim 11, further comprising:
  processing, with the plurality of image classifiers, each video frame in the video data;
  returning, by the plurality of image classifiers, a binary indicator of the first object type by a corresponding image classifier for the first object type;
  selectively processing, with the corresponding object detector and responsive to the corresponding image classifier determining that the first object type is present, a subset of video frames to determine the position information for the detected object; and
  returning, by the corresponding object detector, position information values for the detected object.

15. The computer-implemented method of claim 14, further comprising:
  returning, by the corresponding image classifier, an image type confidence value for the first object type; and
  returning, by the corresponding object detector, an object detected confidence value for the detected object.

16. The computer-implemented method of claim 15, further comprising:
  comparing the object detected confidence value to an object verification threshold;
  responsive to the object detected confidence value meeting the object verification threshold, verifying, using the corresponding image classifier, the first object type; and
  responsive to the verification of the first object type being negative, reporting a detection failure event.

17. The computer-implemented method of claim 11, further comprising:
  initiating, responsive to the position information for the detected object, an object tracking algorithm for the detected object to process subsequent video frames of the video data;
  determining, using the object tracking algorithm, whether the detected object is present in the subsequent video frames of the time-dependent video stream;
  responsive to the object tracking algorithm determining an object exit event, verifying, using the plurality of image classifiers, the first object type in a video frame corresponding to the object exit event; and
  responsive to verifying that the first object type is present in the video frame corresponding to the object exit event, reporting a detection failure event.

18. The computer-implemented method of claim 11, further comprising:
  processing, by the plurality of image classifiers, the video data from the video image sensor as video frames are received by a controller; and
  selectively processing, by the corresponding object detector, a subset of the video data responsive to the plurality of image classifiers determining that the first object type is present in a classified video data frame.

19. The computer-implemented method of claim 11, wherein each image classifier of the plurality of image classifiers is configured to process the first frame through an image classification algorithm configured to comprehend the first frame as a whole to determine a presence or absence of a corresponding object type for that image classifier.

20. A storage system, comprising:
  a video image sensor;
  a plurality of image classifiers, wherein each image classifier of the plurality of image classifiers is configured for a different object type;
  a plurality of object detectors, wherein each object detector of the plurality of object detectors is configured for a different object type;
  means for receiving video data from the video image sensor, wherein the video data includes a time-dependent stream of video frames captured by the video image sensor;
  means for determining, using the plurality of image classifiers, whether a first object type is present in a first frame of the video data;
  means for determining a corresponding object detector from the plurality of object detectors, wherein the corresponding object detector is configured to detect an object type corresponding to the first object type determined by the plurality of image classifiers;
  means for determining, using the corresponding object detector, position information for a detected object in the video data having the first object type; and
  means for sending, over a network, an event notification to a video surveillance application.

* * * * *